(12) United States Patent
Park

(10) Patent No.: US 11,654,414 B2
(45) Date of Patent: May 23, 2023

(54) HYDROGEN REFORMING SYSTEM

(71) Applicants: Hyundai Motor Company, Seoul (KR); Kia Motors Corporation, Seoul (KR)

(72) Inventor: Jung Joo Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 223 days.

(21) Appl. No.: 16/915,324

(22) Filed: Jun. 29, 2020

(65) Prior Publication Data

US 2021/0252471 A1    Aug. 19, 2021

(30) Foreign Application Priority Data

Feb. 14, 2020 (KR) .................. 10-2020-0018113

(51) Int. Cl.
*C01B 3/34* (2006.01)
*C01B 3/48* (2006.01)
(Continued)

(52) U.S. Cl.
CPC ........ *B01J 19/2445* (2013.01); *B01D 53/047* (2013.01); *B01J 19/0013* (2013.01); *C01B 3/48* (2013.01); *C01B 3/56* (2013.01); *B01D 2256/16* (2013.01); *B01D 2257/30* (2013.01); *B01D 2257/504* (2013.01); *B01J 2219/00076* (2013.01); *B01J 2219/00105* (2013.01); *B01J 2219/00157* (2013.01); *C01B 2203/0233* (2013.01); *C01B 2203/0238* (2013.01); *C01B 2203/0283* (2013.01);
(Continued)

(58) Field of Classification Search
None
See application file for complete search history.

(56) References Cited

U.S. PATENT DOCUMENTS

| 2010/0037521 | A1* | 2/2010 | Vakil ....................... C01B 3/382 |
| | | | 48/127.5 |
| 2016/0311683 | A1* | 10/2016 | Spitzl ....................... D06F 57/12 |
| 2021/0061655 | A1* | 3/2021 | El-Halwagi ............... B01J 19/24 |

FOREIGN PATENT DOCUMENTS

| CN | 110357039 A | * 10/2019 | ............... C01B 3/34 |
| DE | 102007022723 A1 | * 11/2008 | ............... C01B 3/46 |

(Continued)

*Primary Examiner* — Jennifer A Leung
(74) *Attorney, Agent, or Firm* — Fox Rothschild LLP

(57) ABSTRACT

A hydrogen reforming system is provided and includes a steam reforming system, a dry reforming system, and a water supply device. The steam reforming system is configured to (i) receive a raw material gas and react the raw material gas with water to generate a first mixed gas containing hydrogen and carbon monoxide, (ii) react the first mixed gas with the water to generate hydrogen and carbon dioxide, and (iii) discharge hydrogen and carbon dioxide. The dry reforming system is configured to (i) receive and react the raw material gas and the carbon dioxide discharged from the steam reforming system to generate a second mixed gas containing hydrogen, (ii) react the second mixed gas with the water to generate hydrogen and carbon dioxide, and (iii) discharge hydrogen and carbon dioxide. The water supply device is configured to supply the water to the steam reforming system and the dry reforming system.

11 Claims, 3 Drawing Sheets

(51) Int. Cl.
*B01J 19/24* (2006.01)
*C01B 3/56* (2006.01)
*B01D 53/047* (2006.01)
*B01J 19/00* (2006.01)

(52) U.S. Cl.
CPC . *C01B 2203/042* (2013.01); *C01B 2203/0811* (2013.01); *C01B 2203/0883* (2013.01); *C01B 2203/127* (2013.01); *C01B 2203/141* (2013.01)

(56) References Cited

FOREIGN PATENT DOCUMENTS

| | | | |
|---|---|---|---|
| JP | 2016175818 A | * | 10/2016 |
| KR | 2013-0037807 A | | 4/2013 |
| KR | 101571982 B1 | | 11/2015 |

* cited by examiner

HYDROGEN REFORMING SYSTEM

CROSS REFERENCE TO RELATED APPLICATION

The present application claims priority to Korean Patent Application No. 10-2020-0018113, filed Feb. 14, 2020, the entire contents of which is incorporated herein for all purposes by this reference.

TECHNICAL FIELD

The present invention relates to a hydrogen reforming system in which a steam reforming system and a dry reforming system are connected to utilize carbon dioxide generated in the steam reforming system in the dry reforming system, and water is heated and supplied by a water supply device connected to heat-exchange with the steam reforming system and the dry reforming system.

BACKGROUND

In the case in which hydrogen is used as a fuel, since there are no harmful products for the environment except for a very small amount of nitrogen oxides, and it is easy to store in various forms such as high pressure gas, liquefied gas, or metal hydride, technology using hydrogen as an energy source has been developed in various fields.

As a method for producing hydrogen, in the related art, steam reforming and dry reforming are the most common technologies. For example, during the reforming process, natural gas such as city gas is used as a raw material, and hydrogen is produced from raw material gas through a reformer and used. The reformation of raw material gas is a technology that quickly and inexpensively converts the raw material gas to hydrogen fuel, which may be said to be the core technology of fuel cell supply such as high efficiency, miniaturization, light weight, start-up stability and speed.

Since steam reforming and dry reforming reactions are very strong endothermic reactions, a fuel gas is burned in a burner to heat the reformer at a high temperature to supply heat necessary for the reaction. In order to purify hydrogen from the gas produced after the reforming reaction, ultra-high purity hydrogen gas is generated by a pressure swing adsorption (PSA).

Various methods have been developed to increase a heat exchange efficiency of the steam reforming and the dry reforming. However, according to the related art, since a steam reforming system or a dry reforming system was each formed in a single process, there was a limit in increasing the amount of hydrogen production. In addition, in order to heat water ($H_2O$) used in the process, since a plurality of heating units exist in the single process, there is a disadvantage that a structure is complicated and it is not easy to control the temperature to be heat-exchanged.

SUMMARY

In preferred aspects, provided is a hydrogen deforming system in which a steam reforming system and a dry reforming system are connected, and a water supply device is connected to be heat-exchangeable with the steam reforming system and the dry reforming system.

In an aspect, provided is a hydrogen reforming system that includes: a steam reforming system configured to (i) receive a raw material gas and react the raw material gas with water to generate a first mixed gas containing hydrogen and carbon dioxide, (ii) react the first mixed gas with the water to generate hydrogen and carbon dioxide, and (iii) discharge hydrogen and carbon dioxide; a dry reforming system configured to (i) receive and react the raw material gas and the carbon dioxide discharged from the steam reforming system to generate a second mixed gas containing hydrogen, (ii) react the second mixed gas with the water to separate the second mixed gas into hydrogen and carbon dioxide, and (iii) discharge hydrogen and carbon dioxide; and a water supply device configured to supply the water to the steam reforming system and the dry reforming system.

The water supply device may be connected to be heat-exchangeable with the steam reforming system and the dry reforming system, and the water may be heated by heat exchange while flowing through the water supplying device to supply thermal energy to the steam reforming system and the dry reforming system.

Each of the steam reforming system and the dry reforming system may include a heat exchange unit configured to exchange heat with the water flowing through the water supply device, and the water supply device may be connected to the heat exchange unit and the water may be heated while sequentially or selectively passing through the each heat exchange unit to supply the thermal energy to the steam reforming system and the dry reforming system.

The hydrogen reforming system may further include a desulfurization device configured to remove sulfur (S) from the raw material gas. Preferably, the raw material gas that has passed through the desulfurization device may be introduced into the steam reforming system and the dry reforming system, respectively. The desulfurization device may be provided in each of the steam reforming system and the dry reforming system to remove sulfur from the introduced raw material gas.

The steam reforming system may include a steam reforming unit configured to react the raw material gas with the water to generate the first mixed gas containing hydrogen, a first water gas shift unit in which a shift reaction converting carbon monoxide into hydrogen and carbon dioxide by reacting the first mixed gas discharged from the steam reforming unit with the water occurs, and a first pressure swing adsorption (PSA) configured to separate hydrogen from gas discharged from the first water gas shift unit. The dry reforming system may include a dry reforming unit configured to receive carbon dioxide discharged from the first PSA and react carbon dioxide with the raw material gas to generate the second mixed gas containing hydrogen, a second water gas shift unit in which a shift reaction converting carbon monoxide into hydrogen and carbon dioxide by reacting the second mixed gas discharged from the dry reforming unit with the water occurs, and a second PSA configured to separate hydrogen from gas discharged from the second water gas shift unit.

Each of the steam reforming system and the dry reforming system may include a heat exchange unit configured to exchange heat with the water flowing through the water supply device, the heat exchange unit may include a first heat exchange unit in which the first water gas shift unit exchanges heat with the water, a second heat exchange unit in which the second water gas shift unit exchanges heat with the water, a third heat exchange unit in which the steam reforming unit exchanges with heat with the water, and a fourth heat exchange unit in which the dry reforming unit exchanges heat with the water, and the water supply device may be connected to the heat exchange unit so that the heat exchange unit exchanges heat with the water, and the water may be heated while passing through each heat exchange unit and supplied to the steam reforming system and the dry reforming system.

The water supply device may be configured such that the water is heated by sequentially or selectively passing through the first heat exchange unit to the fourth heat exchange unit and supplied to the steam reforming system and the dry reforming system.

The water supply device may be configured to (i) supply the water to the first heat exchange unit when the hydrogen reforming system is operated at a high load, (ii) heat the water while the water passes through the first heat exchange unit to the fourth heat exchange unit and exchanges heat with the first heat exchange unit to the fourth heat exchange unit, (iii) introduce the water into the second water gas shift unit after the water passes through the second heat exchange unit, and (iv) introduce the water into the steam reforming unit after the water passes through the fourth heat exchange unit.

Alternatively, the water supply device may be configured to (i) supply the water to the second heat exchange unit when the hydrogen reforming system is operated at a low load, (ii) heat the water while the water exchanges heat with the second heat exchange unit to the fourth heat exchange unit, (iii) introduce the water into the second water gas shift unit after the water passes through the second heat exchange unit, and (iv) introduce the water into the steam reforming unit while the water passes through the fourth heat exchange unit.

Each of the steam reforming unit of the steam reforming system and the dry reforming unit of the dry reforming system may include a burner that supplies heat, and the burner may selectively control the amount of thermal energy supplied to the steam reforming unit and the dry reforming unit.

The hydrogen reforming system may further include a burner that supplies heat in the steam reforming system and the dry reforming system. Preferably, the burner may be provided in the steam reforming system and the dry reforming system, respectively, to supply the heat, and heat generated from the burner of the steam reforming system and thermal energy recovered by the water supply device and a plurality of heat exchange units are recovered and supplied to the dry reforming system.

The burner may be provided with a plurality of ignition nozzles connected to the steam reforming system and the dry reforming system to supply the heat and control the plurality of ignition nozzles to control the supplied heat.

Other aspects of the invention are disclosed infra.

DETAILED DESCRIPTION

Figure 1:
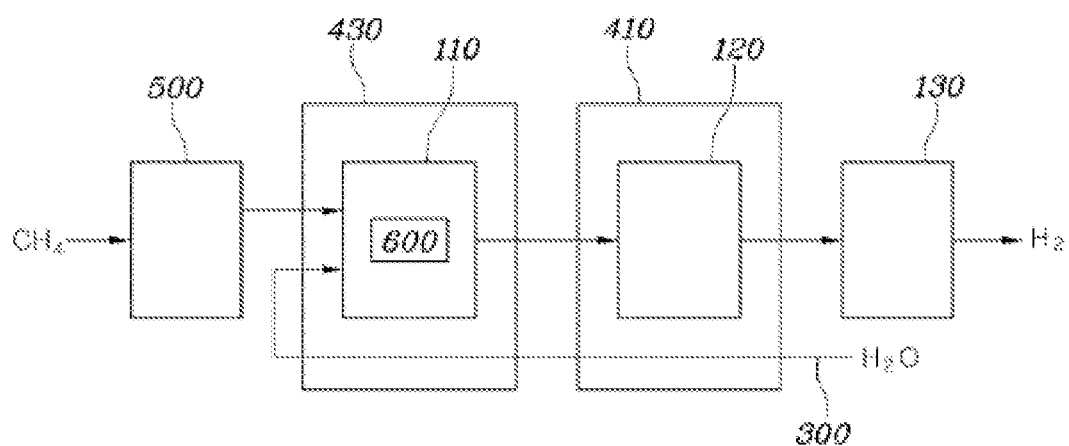
FIG. 1 is a view illustrating a basic steam reforming system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In this specification, it should be understood that terms such as "comprise", "include", or "have" are intended to indicate that there is a feature, a number, a step, an operation, a component, a part, or a combination thereof described on the specification, and do not exclude the possibility of the presence or the addition of one or more other features, numbers, steps, operations, components, parts, or combinations thereof.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions will be provided only in order to describe various embodiments of the present invention disclosed in the present specification or application. Therefore, the embodiments of the present invention may be implemented in various forms, and are not to be interpreted as being limited to embodiments described in the present specification or application.

Since the embodiments of the present invention may be variously modified and may have several forms, specific embodiments will be illustrated in the accompanying drawings and will be described in detail in the present specification or application. However, this is not intended to limit the embodiment according to the concept of the present invention to a specific invention form, and it should be understood to include all modifications, equivalents, or substitutes included in the spirit and scope of the present invention.

Terms such as 'first', 'second', etc., may be used to describe various components, but the components are not to be construed as being limited to the terms. The terms are used only to distinguish one component from another component. For example, the first component may be referred to as the second component, and similarly, the second component may also be referred to as the first component, without departing from the scope of the present invention.

Hereinafter, embodiments of the present invention will be described in detail with reference to the accompanying drawings. Like reference numerals proposed in each drawing denote like components.

The present invention relates to a hydrogen reforming system capable of increasing the amount of production and economic efficiency by connecting a steam reforming system 100 and a dry reforming system 200 to produce hydrogen and increasing thermal efficiency by configuring a water supply device 300 connected to be heat-exchangeable with the steam reforming system and the dry reforming system 200 to heat and supply water.

FIG. 1 is a view illustrating a basic steam reforming system 100. The general steam reforming system 100 will be briefly described with reference to FIG. 1.

As shown in FIG. 1, the steam reforming system 100 may include a desulfurization device 500 for removing sulfur (S)

from raw material gas, a steam reforming unit 110 for reacting the raw material gas with water, a water gas shift unit 120 in which a shift reaction converting carbon monoxide to hydrogen and carbon dioxide occurs, a pressure swing adsorption (PSA) 130 for separating the hydrogen. The raw material gas may be various gases that are vaporized by being transported in a liquefied state such as LNG and LPG.

The steam reforming system 100 may react the raw material gas with water to produce hydrogen. A chemical formula of a steam reforming reaction, which is a chemical reaction in the steam reforming unit 110, is as follows.

$$CH_4 + H_2O \rightarrow CO + 3H_2 \qquad \text{[Chemical Formula 1]}$$

The steam reforming reaction in which methane and water vapor react is a very strong endothermic reaction. Therefore, since a positive reaction actively occurs under high temperature conditions, the steam reforming unit 110 includes a burner 600 that supplies reaction heat to the steam reforming unit 110. In general, the reaction occurs at a temperature of about 700 to 800° C.

As the steam reforming reaction occurs, carbon monoxide is produced along with hydrogen. Since carbon monoxide acts as a catalyst poison to a catalyst used in an electrode of a fuel cell stack, a water gas shift process is required to remove carbon monoxide. In general, as a reaction for removing carbon monoxide, a shift reaction as shown in the following Chemical Formula 2 occurring in the water gas shift unit 120 is used.

$$CO + H_2O \rightarrow CO_2 + H_2 \qquad \text{[Chemical Formula 2]}$$

The shift reaction is generally performed at a temperature of about 200 to 300° C.

On the other hand, in the case of the dry reforming system 200, a dry reforming reaction in which the raw material gas reacts with carbon dioxide to generate carbon monoxide occurs in a dry reforming unit 210, and a chemical formula is as shown in the following Chemical Formula 3.

$$CH_4 + CO_2 \rightarrow 2CO + 2H_2 \qquad \text{[Chemical Formula 3]}$$

The dry reforming reaction occurring in the dry reforming unit 210 also corresponds to a very strong endothermic reaction. Therefore, a burner 600 that supplies reaction heat to the dry reforming unit 210 may be provided, and a temperature at which the dry reforming reaction is performed is about 900 to 1000° C. The process after the dry reforming reaction is the same as the steam reforming system 100.

According to the steam reforming system 100 or the dry reforming system 200 described above, since only a single process is operated, there is a limit to the amount of hydrogen that may be produced. Further, since there is a heat exchange unit for heating water in the single process, there is a disadvantage that a structure is complicated and it is not easy to control a heat exchange temperature, and since a temperature difference between an outlet end of the steam reforming unit 110 and an inlet end of the water gas shift unit 120 is small, there is a problem in that practical heat exchange efficiency is also low.

Figure 2:
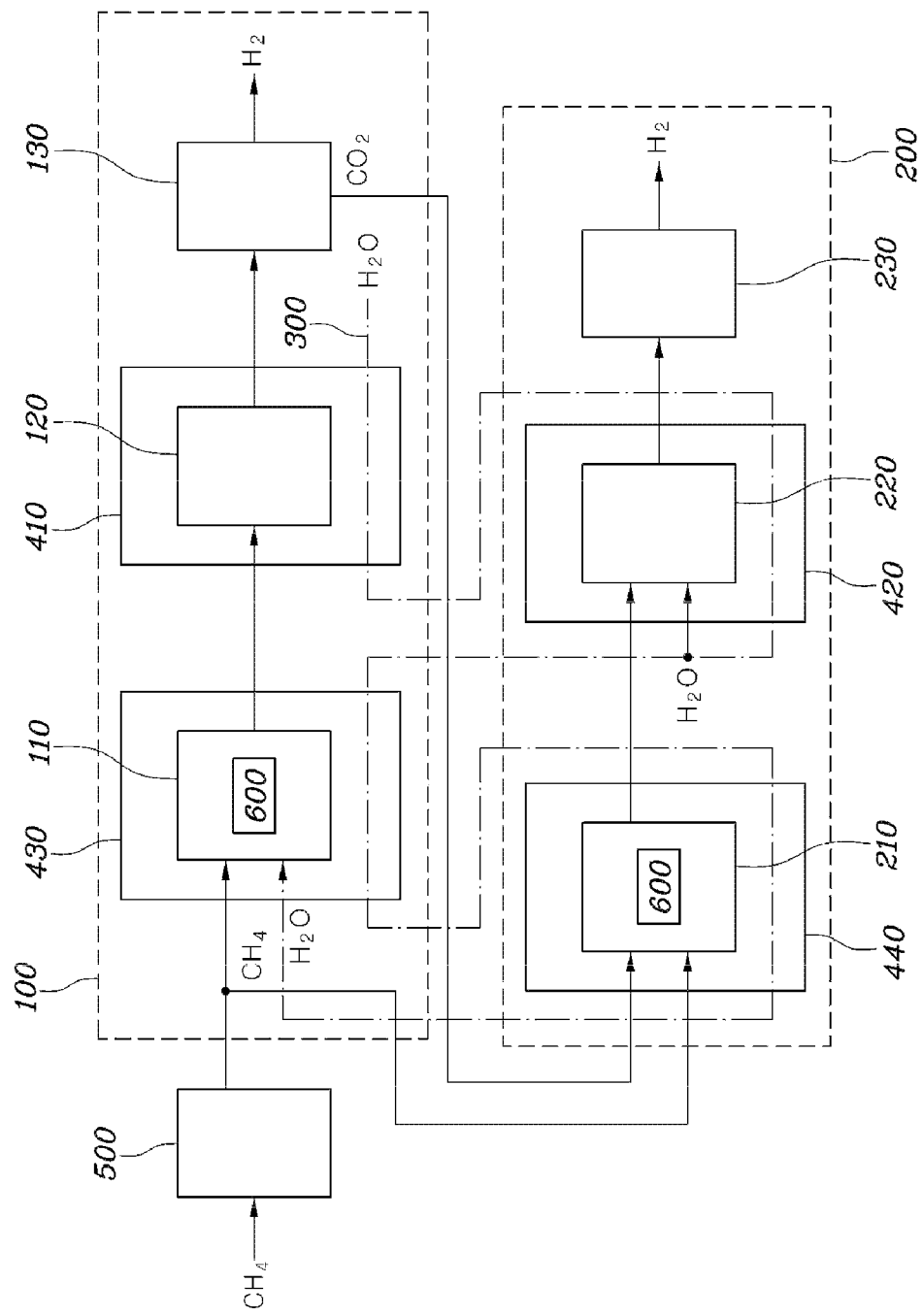
FIG. 2 is a view illustrating a case in which a hydrogen reforming system according to an embodiment of the present invention is operated at a high load.

FIG. 2 is a view illustrating a case in which a hydrogen reforming system according to an embodiment of the present invention is operated at a high load.

Referring to FIG. 2, the hydrogen reforming system according to an embodiment of the present invention may include the steam reforming system 100, the dry reforming system 200, and the water supply device 300.

The steam reforming system 100 may generate hydrogen from a raw material gas containing hydrocarbon by a steam reforming reaction. The raw material gas is introduced into the hydrogen reforming system, and a steam reforming reaction that reacts with water first occurs, and as a result, a first mixed gas containing hydrogen and carbon monoxide may be produced. The carbon monoxide in the first mixed gas may be supplied to the PSA 130 after carbon dioxide and hydrogen are generated by the shift reaction, and hydrogen may be purified and discharged.

The carbon dioxide generated in the steam reforming system 100 may be introduced into the dry reforming system 200. The dry reforming system 200 may generate hydrogen by a dry reforming reaction in which hydrogen and carbon monoxide are generated by reacting raw material gas and carbon dioxide. The carbon dioxide used in the dry reforming system 200 in the hydrogen reforming system according to an exemplary embodiment of the present invention may include the carbon dioxide discharged from the steam reforming system 100.

The dry reforming system 200 may react raw material gas and carbon dioxide discharged from the steam reforming system 100 by receiving the raw material gas and the carbon dioxide discharged from the steam reforming system 100 to generate a second mixed gas containing hydrogen and carbon monoxide. The second mixed gas may be separated into hydrogen and carbon dioxide by reacting with water by the shift reaction.

The water supply device 300 is a device that supplies water necessary for producing hydrogen from the raw material gas by supplying the water to the steam reforming system 100 and the dry reforming system 200. As shown in FIG. 2, the water supplied from the water supply device 300 may be connected to be heat-exchangeable with the steam reforming system 100 and the dry reforming system 200. When the water is supplied from the water supply device 300, the water is heat-exchanged with the steam reforming system 100 and the dry reforming system 200 while flowing and is heated, and the heated water may be supplied. Here, the water may be pure water or ultrapure water.

For example, the steam reforming system 100 and the dry reforming system 200 may include a heat exchange unit in which the water flowing through the water supply device 300 may be heat-exchanged while flowing. There may be one or more heat exchange units. The heat exchange unit is connected to the water supply device 300 so that the water may sequentially or selectively pass through the heat exchange unit. The water is heated by heat exchange while passing through the heat exchange unit, and the heated water may be supplied to the steam reforming system 100 and the dry reforming system 200.

In addition, the hydrogen reforming system according to an exemplary embodiment of the present invention may further include a desulfurization device 500. The desulfurization device 500 is a device for removing sulfur (S) from the raw material gas. A desulfurization process is a process of purifying high purity hydrogen suitable for a fuel cell. Since sulfur compounds contained in a hydrocarbon fuel have a problem of reducing activity of a reforming catalyst or a water gas shift catalyst and reducing electrode characteristics of the fuel cell, sulfur is removed from the raw material gas through the desulfurization device 500.

Figure 3:
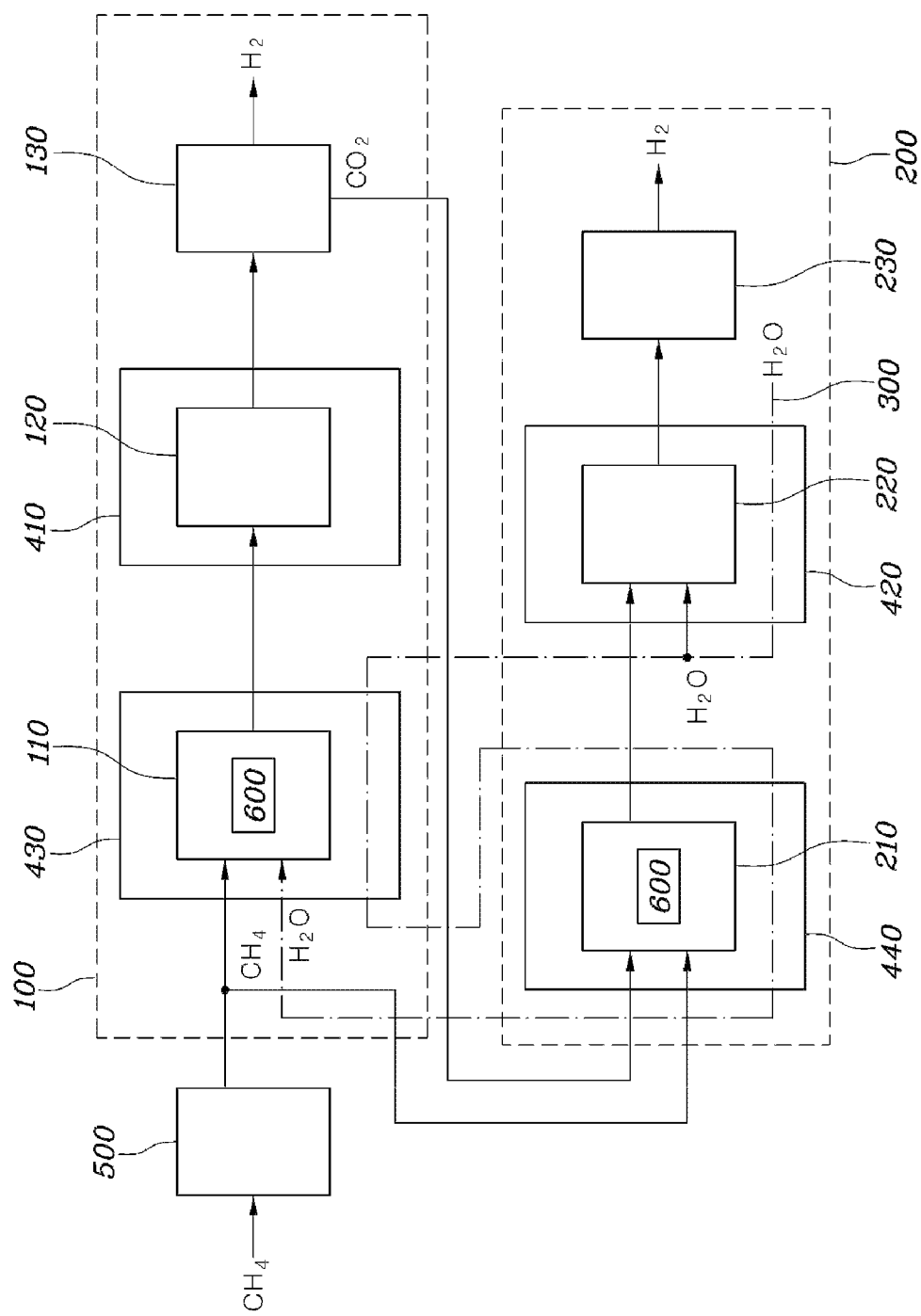
FIG. 3 is a view illustrating a case in which the hydrogen reforming system according to an embodiment of the present invention is operated at a low load.

As shown in FIGS. 2 and 3, the desulfurization device 500 is separately provided for common use in the steam reforming system 100 and the dry reforming system 200, such that the raw material gas may be introduced into the steam reforming system 100 and the dry reforming system 200 after sulfur is removed by the desulfurization device 500. Alternatively, the desulfurization device 500 is provided in the steam reforming system 100 and the dry reforming system 200, respectively, to remove sulfur from the raw material gas introduced into each system.

Although not illustrated in the drawing, the desulfurization device 500 is provided in the steam reforming system 100 and the dry reforming system 200, respectively, to remove sulfur from the introduced raw material gas. For example, the desulfurization device 500 is not commonly used for the steam reforming system 100 and the dry reforming system 200, and may be separately provided for each system.

In addition, the hydrogen reforming system according to an exemplary embodiment of the present invention may further include a burner 600 that supplies heat of reaction. The burner 600 heats the hydrogen reforming system to supply the heat of reaction necessary for the reforming reaction so that the reforming reaction may occur. The burner 600 may be provided in the steam reforming system 100 and the dry reforming system 200, respectively, to supply heat. Alternatively, a burner 600 that is commonly used for each system is provided, and the burner 600 may be provided with a plurality of ignition nozzles connected to the steam reforming system 100 and the dry reforming system 200 to supply heat and may be configured to control the plurality of ignition nozzles to control thermal energy supplied to each system.

A configuration of the hydrogen reforming system according to an exemplary embodiment of the present invention will be described in more detail as follows as shown in FIGS. 2 and 3.

The steam reforming system 100 may include the steam reforming unit 110, the first water gas shift unit 120, and the first PSA 130.

The steam reforming system 110 may generate a first mixed gas containing hydrogen by the steam reforming reaction in which a raw material gas introduced thereinto reacts with water. In order for the reaction described in Chemical Formula 1 to occur, the water supply device 300 may supply water to the steam reforming unit 110.

The first mixed gas generated in the steam reforming unit 110 may be introduced into the first water gas shift unit 120, and in the first water gas shift unit 120, a shift reaction in which the first mixed gas reacts with the remaining water to convert carbon monoxide into hydrogen and carbon dioxide may occur.

The first PSA 130 may separate hydrogen from the gas discharged from the first water gas shift unit 120 to purify high purity hydrogen gas and discharge carbon dioxide.

The dry reforming system 200 may include a dry reforming unit 210, a second water gas shift unit 220, and a second PSA 230.

The dry reforming unit 210 may be supplied with carbon dioxide discharged from the first PSA 130. The dry reforming unit 210 may be connected to the first PSA 130 by a gas line or the like to receive carbon dioxide. In the dry reforming unit 210, the raw material gas and carbon dioxide react to generate a second mixed gas containing hydrogen.

The second mixed gas generated in the dry reforming unit 210 may be introduced into the second water gas shift unit 220. In the second water gas shift unit 220, a shift reaction in which water is supplied by the water supply device 300 to react the second mixed gas with water, and carbon monoxide is converted into hydrogen and carbon dioxide may occur.

The second PSA 230 may separate hydrogen from the gas discharged from the second water gas shift unit 220 to purify high purity hydrogen gas and discharge carbon dioxide.

The steam reforming system 100 and the dry reforming system 200 may be operated in conjunction so that carbon dioxide discharged from the first PSA 130 is introduced into the dry reforming unit 210 to cause the dry reforming reaction. Therefore, compared to a system that produces hydrogen in a single process, there is an effect that the amount of hydrogen production may be doubled by connecting both processes.

In addition, the steam reforming system 100 and the dry reforming system 200 may each include a heat exchange unit in which the water flowing through the water supply device 300 may be heat-exchanged, and there are one more heat exchange units. As shown in FIGS. 2 and 3, the heat exchange unit may include a first heat exchange unit 410 to a fourth heat exchange unit 440.

In the first heat exchange unit 410, the first water gas shift unit 120 may exchange heat with water, in the second heat exchange unit 420, the second water gas shift unit 220 may exchange heat with water, in the third heat exchange unit 430, the steam reforming unit 110 may exchange heat with water, and in the fourth heat exchange unit 440, the dry reforming unit 210 may exchange heat with water.

Each heat exchange unit may be connected to the water supply device 300 to be heat-exchangeable with water, and the water may be heated while passing through each heat exchange unit. The water flowing through the water supply device 300 may be heated by sequentially or selectively passing through the first heat exchange unit 410 to the fourth heat exchange unit 440.

In the case of the related art, a water heating unit was additionally installed to increase a temperature of the water, whereby the structure of the system was complicated and there was a limit to the temperature rise. As described above, the heat of reaction is required to perform the reforming reaction and the shift reaction. According to various embodiments of the present invention, since the heat exchange unit for heating the water by utilizing the heat of reaction is provided, it is possible to utilize waste heat of the system by a simple structure by heating the water and then supplying the heated water to each system. Therefore, efficiency of an entire system may be increased.

A case in which the hydrogen reforming system according to an exemplary embodiment of the present invention is operated at a high load or a low load will be described in detail with reference to FIGS. 2 and 3. However, a temperature value mentioned in the following description is only an example for describing the system, and is not limited to the described temperature. The high load means a case in which the hydrogen reforming system is operated at about 50% or greater, and the low load means a case in which the hydrogen reforming system is operated at less than about 50%.

The case in which the hydrogen reforming system according to an exemplary embodiment of the present invention is operated at the high load will be described as follows with reference to FIG. 2.

In the case in which the hydrogen reforming system according to an exemplary embodiment of the present invention is operated at the high load, the water supply device 300 may supply water to the first heat exchange unit 410. A temperature of the water supplied to the first heat exchange unit 410 may be about 25° C., which is a general water temperature. In the first heat exchange unit 410, the first water gas shift unit 120 exchanges heat with water, and since the first water gas shift unit 120 in which the shift reaction occurs is generally maintained at a temperature of about 200 to 300° C., the water may be heated to a temperature of about 150° C. when passing through the first heat exchange unit 410.

The water passes through the first heat exchange unit 410 and is then introduced into the second heat exchange unit 420, and in the second heat exchange unit 420, the second water gas shift unit 220 exchanges heat with the water. Since the second water gas shift unit 220 is also generally maintained at a temperature of about 200 to 300° C., the water may be heated to a temperature of about 250° C. while passing through the second heat exchange unit 420.

After passing through the second heat exchange unit 420, some of the water may be introduced into the second water gas shift unit 220. The introduced water becomes a reactant of the shift reaction in the second water gas shift unit 220, and since the introduced water is introduced in a heated state at a temperature of about 250° C., the shift reaction that is the endothermic reaction may actively occur.

After passing through the second heat exchange unit 420, the water may be introduced into the third heat exchange unit 430. In the third heat exchange unit 430, the steam reforming unit 110 may exchange heat with the water. Since the steam reforming unit 110 in which the steam reforming reaction occurs is maintained at a temperature of about 700 to 800° C., the water may be heated to a temperature of about 600° C. while passing through the third heat exchange unit 430.

The water that has passed through the third heat exchange unit 430 may be introduced into the fourth heat exchange unit 440. In the fourth heat exchange unit 440, the dry reforming unit 210 may exchange heat with the water. Since the dry reforming unit 210 in which the dry reforming reaction occurs is maintained at a temperature of about 900 to 1000° C., the water may be heated to a temperature of about 750° C. while passing through the fourth heat exchange unit 440. The water may be introduced into the steam reforming unit 110 after passing through the fourth heat exchange unit 440, and since the temperature of the water introduced into the steam reforming unit 110 is high, a positive reaction of the steam reforming reaction, which is a strong endothermic reaction, may actively occur.

As described above, in the case in which the hydrogen reforming system is operated at the high load, the water may be heated and supplied through the first heat exchange unit 410 to the fourth heat exchange unit 440, thereby increasing a yield of hydrogen.

FIG. 3 is a view illustrating a case in which the hydrogen reforming system according to an exemplary embodiment of the present invention is operated at a low load.

As shown in FIG. 3, the water supply device 300 may supply water to the second heat exchange unit 420. A temperature of the water supplied to the second heat exchange unit 420 may be about 25° C., which is a general water temperature. In the second heat exchange unit 420, the second water gas shift unit 220 exchanges heat with water, and since the second water gas shift unit 220 in which the shift reaction occurs is generally maintained at a temperature of about 200 to 300° C., the water may be heated to about 150° C. when passing through the first heat exchange unit 410.

After passing through the second heat exchange unit 420, some of the water may be introduced into the second water gas shift unit 220. The introduced water becomes a reactant of the shift reaction in the second water gas shift unit 220, and since the introduced water is introduced in a heated state at a temperature of about 150° C., the shift reaction that is the endothermic reaction may actively occur.

After passing through the second heat exchange unit 420, the water may be introduced into the third heat exchange unit 430. In the third heat exchange unit 430, the steam reforming unit 110 may exchange heat with the water. Since the steam reforming unit 110 in which the steam reforming reaction occurs is maintained at a temperature of about 700 to 800° C., the water may be heated to a temperature of about 500° C. while passing through the third heat exchange unit 430.

The water that has passed through the third heat exchange unit 430 may be introduced into the fourth heat exchange unit 440. In the fourth heat exchange unit 440, the dry reforming unit 210 may exchange heat with the water. Since the dry reforming unit 210 in which the dry reforming reaction occurs is maintained at a temperature of about 900 to 1000° C., the water may be heated to about 650° C. while passing through the fourth heat exchange unit 440. The water may be introduced into the steam reforming unit 110 after passing through the fourth heat exchange unit 440, and since the temperature of the water introduced into the steam reforming unit 110 is high, a positive reaction of the steam reforming reaction, which is a strong endothermic reaction, may actively occur.

Compared to the case in which the hydrogen reforming system is operated at the high load, the temperature of the water supplied to the second water gas shift unit 220 and the steam reforming unit 110 may slightly decrease. Since the target amount of hydrogen production of the case in which the hydrogen reforming system is operated at the low load is smaller than that of the case in which the hydrogen reforming system is operated at the high load, water having a relatively low temperature is supplied. Therefore, the water supply device 300 may be variably operated according to an exemplary operation condition of the hydrogen reforming system to optimize the efficiency of the system.

According to various exemplary embodiments of the present invention as described above, since the water is heated and supplied by heat exchange, the positive reaction may actively occur. Since the amount of hydrogen production may increase, the efficiency of the entire system may be increased. Moreover, due to the increase in the efficiency of the entire system, the yield of hydrogen that may be produced from the raw material gas increases.

In addition, as shown in FIGS. 2 and 3, the steam reforming unit 110 of the steam reforming system 100 and the dry reforming unit 210 of the dry reforming system 200 may include the bunter that supplies heat, and the bunter may selectively control the amount of thermal energy supplied to the steam reforming unit 110 and the dry reforming unit 210. Since the temperature of reaction of the dry reforming reaction is higher than that of the steam reforming reaction, the bunter may differently control the heat supplied to the steam reforming unit 110 and the dry reforming unit 210.

According to various exemplary embodiments of the present invention, since the amount of hydrogen production may be doubled in the single process by utilizing the carbon dioxide discharged from the steam reforming system in the dry reforming system to produce the hydrogen, the amount of hydrogen production may be doubled compared to the single process.

Further, since the water supply device may be connected to be heat-exchangeable with the steam reforming system and the dry reforming system, and heat water by utilizing waste heat generated in each process, a thermal efficiency may be increased.

Although the present invention has been shown and described with respect to specific embodiments, it will be apparent to those having ordinary skill in the art that the present invention may be variously modified and altered without departing from the spirit and scope of the present invention as defined by the following claims.

What is claimed is:

1. A hydrogen reforming system comprising:
a steam reforming system configured to (i) receive a raw material gas and react the raw material gas with water to generate a first mixed gas containing hydrogen and carbon monoxide, (ii) react the first mixed gas with the water to generate hydrogen and carbon dioxide, and (iii) discharge hydrogen and carbon dioxide;
a dry reforming system configured to (i) receive and react the raw material gas and the carbon dioxide discharged from the steam reforming system to generate a second mixed gas containing hydrogen, (ii) react the second mixed gas with the water to generate hydrogen and carbon dioxide, and (iii) discharge hydrogen and carbon dioxide; and
a water supply device configured to supply the water to the steam reforming system and the dry reforming system,
wherein the steam reforming system comprises:
a steam reforming unit configured to react the raw material gas with the water to generate the first mixed gas containing hydrogen and carbon monoxide,
a first water gas shift unit in which a shift reaction converting water and carbon monoxide into hydrogen and carbon dioxide by reacting the first mixed gas discharged from the steam reforming unit with the water occurs, and
a first pressure swing adsorption (PSA) configured to separate hydrogen from gas discharged from the first water gas shift unit and discharge carbon dioxide, and
the dry reforming system comprises:
a dry reforming unit configured to receive carbon dioxide discharged from the first PSA and react carbon dioxide with the raw material gas to generate the second mixed gas containing hydrogen,
a second water gas shift unit in which a shift reaction converting water and carbon monoxide into hydrogen and carbon dioxide by reacting the second mixed gas discharged from the dry reforming unit with the water occurs, and
a second PSA configured to separate hydrogen from gas discharged from the second water gas shift unit;
wherein each of the steam reforming system and the dry reforming system comprises multiple heat exchange units configured to exchange heat with the water flowing through the water supply device,
wherein the multiple heat exchange units comprise:
a first heat exchange unit in which the first water gas shift unit exchanges heat with the water,
a second heat exchange unit in which the second water gas shift unit exchanges heat with the water,
a third heat exchange unit in which the steam reforming unit exchanges heat with the water, and
a fourth heat exchange unit in which the dry reforming unit exchanges heat with the water, and wherein the water supply device is connected to the multiple heat exchange units so that the multiple heat exchange units exchange heat with the water, and the water is heated while passing through each heat exchange unit.

2. The hydrogen reforming system of claim 1, wherein the water supply device is connected to the steam reforming system and the dry reforming system so as to be heat-exchangeable, and
the water is heated by heat exchange while flowing through the water supply device.

3. The hydrogen reforming system of claim 2, wherein each of the steam reforming system and the dry reforming system comprises a heat exchange unit configured to exchange heat with the water flowing through the water supply device, and
the water supply device is connected to the heat exchange units and the water is heated while sequentially or selectively passing through each heat exchange unit.

4. The hydrogen reforming system of claim 1, further comprising a desulfurization device configured to remove sulfur (S) from the raw material gas;
wherein the raw material gas that has passed through the desulfurization device is introduced into the steam reforming system and the dry reforming system, respectively.

5. The hydrogen reforming system of claim 1, further comprising a desulfurization device provided in each of the steam reforming system and the dry reforming system and configured to remove sulfur from the raw material gas.

6. The hydrogen reforming system of claim 1, wherein the water supply device is configured such that the water is heated by sequentially or selectively passing through the first heat exchange unit to the fourth heat exchange unit.

7. The hydrogen reforming system of claim 1, wherein the water supply device is configured to (i) supply the water to the first heat exchange unit when the hydrogen reforming system is operated at a high load, (ii) heat the water while the water passes through the first heat exchange unit to the fourth heat exchange unit and exchanges heat with the first heat exchange unit to the fourth heat exchange unit, (iii) introduce the water into the second water gas shift unit after the water passes through the second heat exchange unit, and (iv) introduce the water into the steam reforming unit after the water passes through the fourth heat exchange unit.

8. The hydrogen reforming system of claim 1, wherein the water supply device is configured to (i) supply the water to the second heat exchange unit when the hydrogen reforming system is operated at a low load, (ii) heat the water while the water exchanges heat with the second heat exchange unit to the fourth heat exchange unit, (iii) introduce the water into the second water gas shift unit after the water passes through the second heat exchange unit, and (iv) introduce the water into the steam reforming unit after the water passes through the fourth heat exchange unit.

9. The hydrogen reforming system of claim 1, wherein each of the steam reforming unit of the steam reforming system and the dry reforming unit of the dry reforming system comprises a burner that supplies heat, and
the burners selectively controls the amount of thermal energy supplied to the steam reforming unit and the dry reforming unit.

10. The hydrogen reforming system of claim 1, further comprising burners that supply heat in the steam reforming system and the dry reforming system;
wherein the burners are provided in the steam reforming system and the dry reforming system, respectively, to supply the heat, and heat generated from the burner of the steam reforming system and thermal energy by contained in the water passing through a plurality of heat exchange units are supplied to the dry reforming system.

11. The hydrogen reforming system of claim 1, further comprising a burner that supplies heat in the steam reforming system and the dry reforming system;
   wherein the burner is provided with a plurality of ignition nozzles connected to the steam reforming system and the dry reforming system to supply the heat and controls the plurality of ignition nozzles to control the supplied heat.

* * * * *